UNITED STATES PATENT OFFICE.

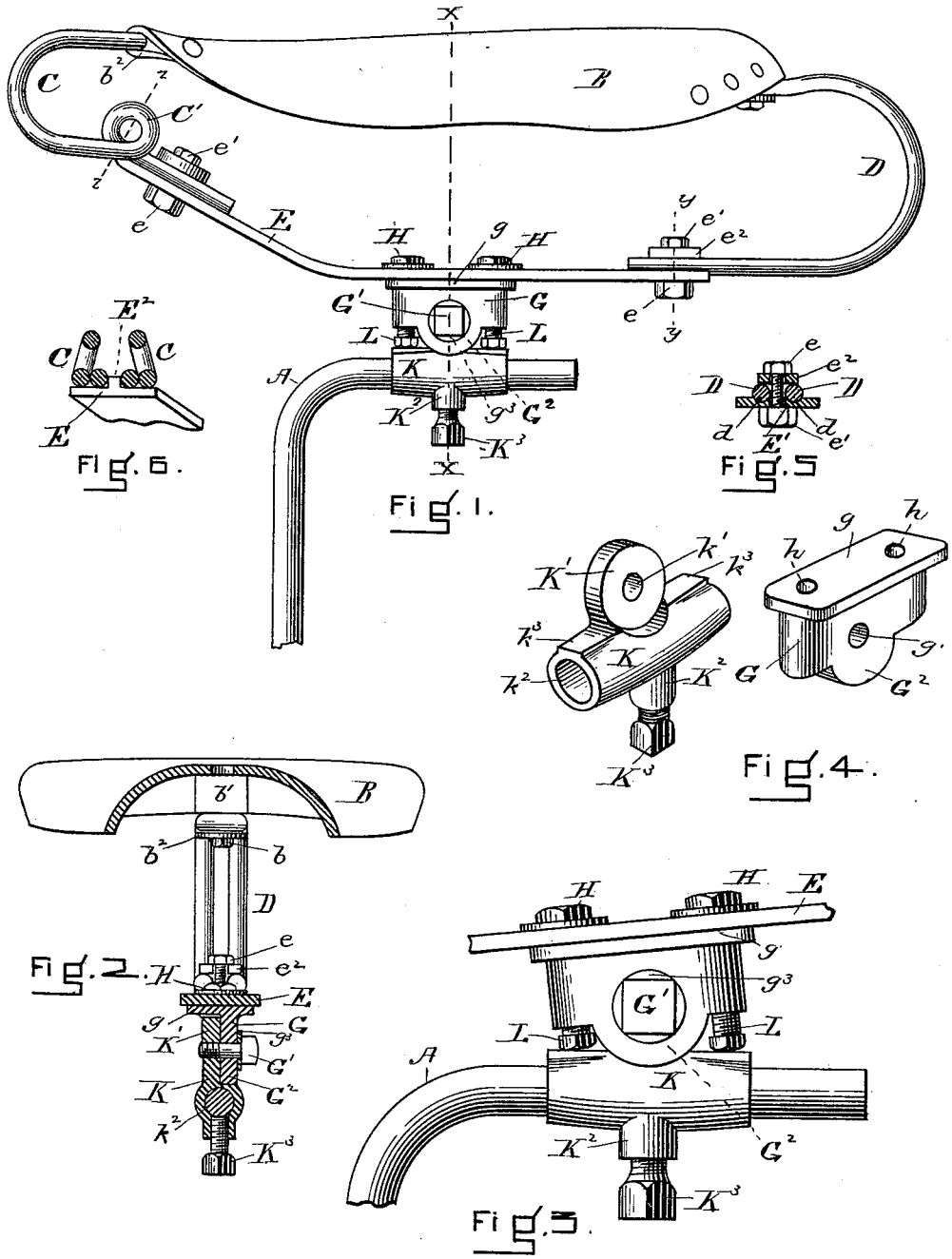

JOHN KNOUS, OF HARTFORD, CONNECTICUT, ASSIGNOR TO THE POPE MANUFACTURING COMPANY, OF PORTLAND, MAINE.

VELOCIPEDE-SADDLE AND SUPPORTING DEVICE.

SPECIFICATION forming part of Letters Patent No. 405,780, dated June 25, 1889.

Application filed October 20, 1888. Serial No. 288,652. (No model.)

*To all whom it may concern:*

Be it known that I, JOHN KNOUS, of Hartford, in the county of Hartford and State of Connecticut, have invented certain new and useful Improvements in Velocipede-Saddles and Supporting Devices therefor, of which the following is a specification.

My present improvements relate more particularly to suspension hammock-saddles, and have for their object the construction of a hammock-saddle for use especially on tricycles and safety-bicycles, where the saddle, with its springs and supporting mechanism, may be connected with a bent seat-rod or L-rod for vertical adjustment.

In carrying out my improvements I use a flexile seat-piece of leather, in any suitable form, and suspended only at the ends, as is usual in hammock-saddles; but underneath this I have a longitudinal bar or under plate of metal, which I prefer to make with a bend or upward incline for about one-third of the forward part, and which is supported or connected by bolts or a clamp or in any suitable manner to the frame or seat supporting rod of the velocipede. Between the ends of the flexile seat-piece and the corresponding ends of the under plate I interpose bent or coiled wire springs connected at their upper ends with the seat-piece in any suitable manner and at their lower ends with the corresponding ends of the under plate by means of bolts and clips or similar devices for adjustment of the tension or extensibility of the springs, and the springs are further so constructed as to have their upper and lower parts nearly horizontal and their intermediate or yielding portions located outside of a line drawn from the end of the seat-piece to the corresponding end of the under plate, so that the yielding portions of the springs shall be substantially out from under the seat-piece, and that the yielding action of the springs shall be principally vertical and independent the action of the one from that of the other, as well as independent in their attachments to and adjustments on the under plate.

In further carrying out my improvements I support the under plate of this saddle so constructed upon a tilt-block pivoted on a horizontal and transverse axis to a clip readily attachable to the seat-rod of the machine, so as to permit a pivotal variation of the seat-piece—that is, to admit of the raising of the rear end and the lowering of the front end, or vice versa, at the same time—to change the angular inclination of the upper surface of the seat-piece fore and aft; and I regulate, adjust, and secure this variation by means of two tilt-screws or small jack-bolts placed in a vertical position between the tilt-block and the frame-clip, one before and the other behind the pivot, so that by turning the tilt-screws, one in and the other out, the saddle may be tilted as desired, and, also, so that each screw sets and holds the other as a set device.

In the accompanying drawings, Figure 1 shows in side elevation a saddle and supporting device and a portion of a seat-rod containing my improvements in one form. Fig. 2 shows the same in vertical transverse section on the line $x\ x$ in Fig. 1 and looking toward the rear, and Figs. 3, 4, 5, and 6 show parts of the same in detail enlarged.

A is a bent seat-rod or L-rod.

B is a flexible seat-piece of leather, supported at its rear end on a metallic bar or end piece $b'$, to which it is riveted in the usual manner, and having at its forward end a loop $b^2$, riveted in the usual manner, this loop and end piece being for the purpose of connection with front and rear springs; but I may use a strap and buckle instead of a riveted loop or a hook, or a different form of transverse plate at the rear end in any way suitable for attachment of the rear springs.

C is a front spring made of steel wire bent and coiled so as to form a pull at the upper portion for the seat-piece and its upper and lower portions nearly horizontal, the lower portion forming a loop or tongue to rest upon the under plate, and the intermediate portion bent, or bent and coiled, as at $C'$, in large or small coils, as may be desired, forward of the end of the under plate and of the seat-piece, so that the yielding portion of the front spring or springs is substantially out from under the seat-piece.

D is a rear spring, formed also of bent or bent and coiled steel wire connected at its upper part by means of the bolt or screw $b$ and washer $b^2$ to the end plate $b'$, and with its lower part nearly horizontal and adapted for connection with the rear end of the under plate, and with its upper and lower ends nearly horizontal, and its intermediate yielding portions backward of the rear end of the seat-piece and the under plate. The rear spring or springs may also be coiled in large or small coils, if desired. The lower portions of these front and rear springs are adjustably attached by the bolts $e\ e$ and nuts $e'\ e'$, and the transverse bars, clips, or washers $e^2\ e^2$, by means of which they are respectively held firmly or released readily, and by releasing either one the spring may be drawn backward or forward, and then fixed in its new position either to change the position of the seat and springs on the under plate, or to increase the tension of the seat and springs.

E is the under plate, which I prefer to make of a strip of thin bar metal or stout sheet metal, extending fore and aft under the middle of the seat-piece and bent upward for about one-third of its length, as shown, at the forward part, this bending up of the forward end being for two reasons: first, the front spring needing less vertical action than the rear spring, and therefore better occupying less space, and, second, the saddle is thereby made more compact forward and less in the way of the dress and limbs of the rider. I make this under plate at the forward end with a nib $E^2$, rising above the upper surface and its middle part, and a similar nib $E'$, or else two grooves $d\ d$, at the rear end of the under plate, and when said grooves are used I prefer to taper them from the end forward to the top surface of the under plate for a short distance, the sides of the grooves leaving sufficient nib. These nibs are for the purpose of stops to prevent the lateral displacement of the springs. The springs are further held to the under plate by means of the small bolts $e\ e$, one at either end, rising in the middle of the plate and between the branches of the springs, with their nuts $e'\ e'$ and the transverse clips or washers $e^2\ e^2$ resting upon the top side of the springs.

G is a tilt-block, of metal, having a plate-seat $g$ for the under plate E to rest upon and be secured to. This may be effected by means of the screws H H, passing through the under plate near its middle portion and threaded into the vertical holes $h\ h$ in the tilt-block, or in any other suitable manner. The tilt-block has an ear $G^2$ projecting downward on one side and having a circular perpendicular face fore and aft and a transverse perforation $g'$ for a horizontal pivot, and threaded holes, one at either end. On the under side, extending vertically to receive tilt-screws K, is a base block or clip of metal, having an ear $K'$, having a vertical fore-and-aft face in circular form and a transverse perforation $k'$ to receive a horizontal pivot, and a longitudinal perforation $k^2$ for a seat upon the L-rod of a velocipede, and upper surfaces or abutments $k^3\ k^3$ for tip-screws, and a threaded portion $K^2$ to receive a set-screw $K^3$ for securing it upon the L-rod.

$G'$ is a horizontal transverse pivot connecting the two ears $G^2\ K'$ by means of a threaded end and corresponding threads in one of the ears and a washer $g^3$, or this pivot may be in the form of a bolt and may be secured by another.

L L are tilt-screws formed for a wrench at one part, as shown, and threaded so as to be screwed into the holes in the under side of the tilt-block G and to abut against the abutments $k^3\ k^3$ on the base-clip.

It is obvious now that when the under plate of the saddle is secured to the tilt-block with the tip-screws L L therein, and this is secured by its ear to the corresponding ear of the base-clip by the transverse horizontal pivot $G'$, and the whole mounted on the L-rod, as shown in Figs. 1 and 3, the saddle may have not only a fore-and-aft adjustment upon the L-rod and an adjustment for tension of the springs and flexile seat, as before described, but also may have a pivotal adjustment upon the pivot $G'$, so that by turning the left-hand tilt-screw L to screw it into the tilt-block, and the right-hand tilt-screw to screw it out of the block, the under plate, and therefore the saddle, may be tilted down at the forward end and tilted up at the back end, as shown in Fig. 3, or vice versa; also, that by tightening one of the tilt-screws against the abutment $k'$ after the other tilt-screw has been set in position, each tilt-screw operates as a set device against the other to secure them in position, and for additional security the pivot $G'$ may be tightened, if necessary, and that the upper surface of the saddle may thus be adjusted fore and aft to any suitable inclination for different riders very readily. It is also obvious that instead of two tilt-screws I may use one tilt-screw, with the facets for the wrench in the middle portion and right and left thread, or a single screw with the head held in either the tilt-block or the base-clip, so as to turn, but not to come out longitudinally and with a set-nut; but I prefer to use two tilt-screws, as shown and described, as being more simple and compact. It is also obvious that other modifications in form or detail of construction may be made without departing from the substance of my invention, and I do not mean to limit myself precisely to the devices shown and described; nor do I mean to claim, broadly, a saddle constructed with a flexile seat-piece and an under plate and independent front and rear springs, nor a saddle having a tilting device, whereby either end may be raised or lowered; but

I claim as new and of my invention—

1. The combination of a flexible seat B, springs C D, under plate E, stops $E'\ E^2$, bolts $e\ e$, and grips $e^2\ e^2$, constructed to operate essentially as set forth.

2. The combination of clip-base K, a longitudinal mortise $k^2$, a threaded seat $K^2$, a set-screw $K^3$, ear K′, a transverse perforation $k'$, a screw-abutment $k^3$ $k^3$, a tilt-block G, plate-seat $g$, ear $G^2$, a transverse perforation $g'$, vertical tip-screws L L, a saddle under plate E, and screws H H, constructed to operate essentially as set forth.

3. The combination of the flexile seat B, the front and rear springs C D and their connecting devices, substantially as set forth, the longitudinal under plate E, and the devices, substantially as set forth, for adjusting and securing the springs upon the under plate longitudinally and laterally.

JNO. KNOUS.

Witnesses:
G. BARNARD,
E. A. DE BLOIS.